United States Statutory Invention Registration [19]

[11] Reg. Number: H345

Williamsen et al. [43] Published: Oct. 6, 1987

[54] MISSILE CANTING SHAPED CHARGE WARHEAD

[75] Inventors: Joel E. Williamsen; Donald E. Lovelace; Michael C. Schexnayder, all of Huntsville, Ala.

[73] Assignee: The United States of America as represented by the Secretary of the Army, Washington, D.C.

[21] Appl. No.: 31,979

[22] Filed: Mar. 30, 1987

[51] Int. Cl.[4] ..... F42B 11/22

[52] U.S. Cl. ..... 102/476

*Primary Examiner*—Harold J. Tudor

*Attorney, Agent, or Firm*—John C. Garvin, Jr.; Freddie M. Bush; James T. Deaton

[57] ABSTRACT

A missile which has a shaped charge warhead mounted therein in such a manner that the shaped charge warhead is automatically pivoted or canted after launch of the missile to present a shaped charge warhead in an advantageous position for destroying a target.

4 Claims, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MISSILE CANTING SHAPED CHARGE WARHEAD

DEDICATORY CLAUSE

The invention described herein may be manufactured, used, and licensed by or for the Government for governmental purposes without the payment to us of any royalties thereon.

BACKGROUND OF THE INVENTION

In the past, shaped charge warheads have been used to penetrate and defeat various types of armored vehicles. As a result, many of these armored vehicles have now incorporated highly sloped frontal armor surfaces which increase the thickness of armor that must be penetrated for frontal attack by shaped charges. Because of this and since present day shaped charged warheads generally attack the armored vehicle head-on, there is a need for a device that can attack the armor of the vehicle in such a manner as to attack the armor in a more advantageous way.

Accordingly, it is an object of this invention to provide a missile with a canting shaped charge warhead for attacking the armor of a vehicle at a thinner cross section.

Another object of this invention is to provide a canted shaped charge that is canted at an angle which is near normal to the armor surface when the shaped charge is set off.

Still another object of this invention is to utilize a shaped charge that is canted so that the shaped charge can be made smaller and yet penetrate the armor of an armored vehicle.

Yet another object of this invention is to provide a missile with a canted shaped charge warhead so as to not require complex trajectory shaping for the missile.

Other objects and advantages of this invention will be obvious to those skilled in this art.

SUMMARY OF THE INVENTION

In accordance with this invention, a missile is provided that has a self-contained warhead section which includes a shaped charge explosive device that is canted about 30° after the missile exits the missile launch tube to orient the shaped charge explosive device into a position for firing through a thinner section of an armored vehicle when arriving at the armored vehicle. By canting the shaped explosive charge device after the missile exits the launch tube allows the use of a larger shaped charge warhead with respect to the overall diameter of the missile in order to provide a charge that has sufficient capability of penetrating the target.

DESCRIPTION OF THE PREFERRED EMBODIMENT

Figure 1:
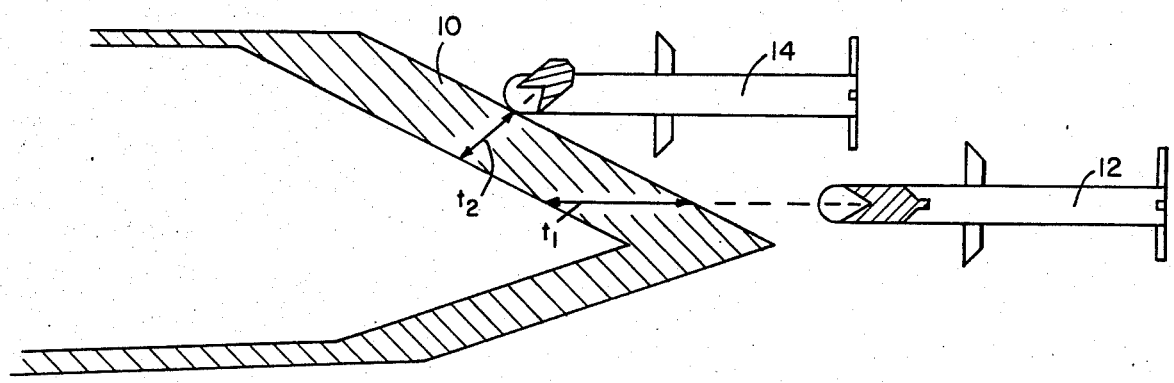
FIG. 1 is a schematic drawing partially in section and illustrating the advantages of attacking the armor from an angle as opposed to head-on, FIG. 2 is a sectional view and partially cut-away illustrating the warhead section in its stowed launch position prior to missile launch.

Referring now to the drawing, in FIG. 1, armor 10 of an armored vehicle is schematically illustrated and a missile 12 with a conventional head-on shaped charge warhead therein is illustrated approaching armor 10 and in this approach the shape charge warhead must travel distance $t_1$ as illustrated in order to penetrate the armor with the shaped charge warhead of missile 12. Applicants have realized that a missile 14 with a canted shaped charge therein can penetrate the armor more readily if attacked as illustrated by the canted shaped charge of the warhead of missile 14 to travel a distance such as illustrated at $t_2$. This particular canted warhead is disclosed in more detail in FIGS. 2 and 3 and includes missile housing 20 with warhead 22 pivotally mounted on two trunnion pins 24 for being rotated and canted relative to the axis of missile housing 20 to assume a canted position as illustrated in FIG. 3. Trunnion pins 24 are mounted in ring structure 26 on warhead 22 and in missile fuselage adapter structure 28 that is mounted as a warhead section of missile 14. Warhead 22 has a conventional shaped charge 30 therein as illustrated and a ballast weight 33 with opening 35 therethrough is mounted at one end of warhead 22 so as to allow the center of gravity of the warhead to remain at the trunnion pin joints 24 during warhead launch and flight positions to prevent missile thrust misalignment. Two extension springs 32 are mounted at one end to warhead structure 22 as illustrated at 34 in FIG. 3 and to the missile fuselage adapter 28 at members 36 (only one of which is shown) to secure the other end of each spring 32. These springs 32 thus bias warhead 22 from the longitudinal position in which the axis thereof is parallel to the longitudinal axis of missile housing 20 as illustrated in FIG. 2 to a canted position which is about 30° relative to the longitudinal axis of missile housing 20.

Figure 2:
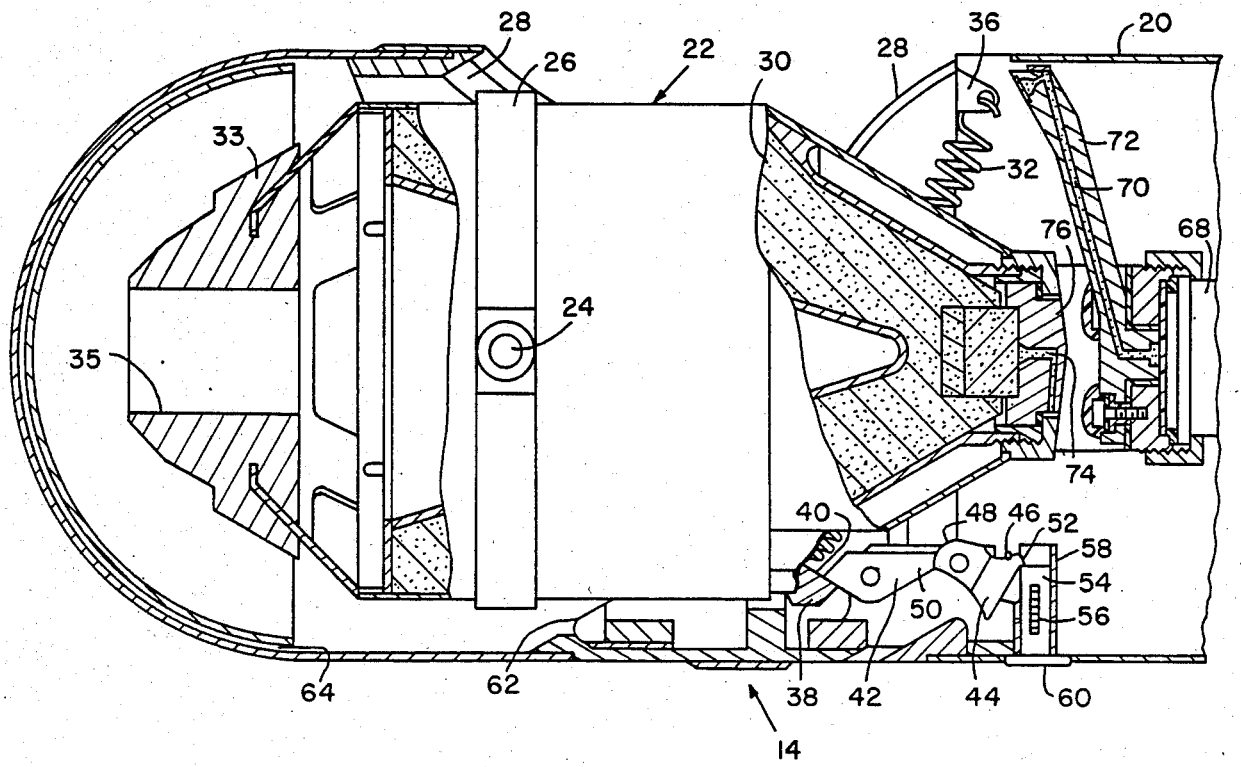
Figure 3:
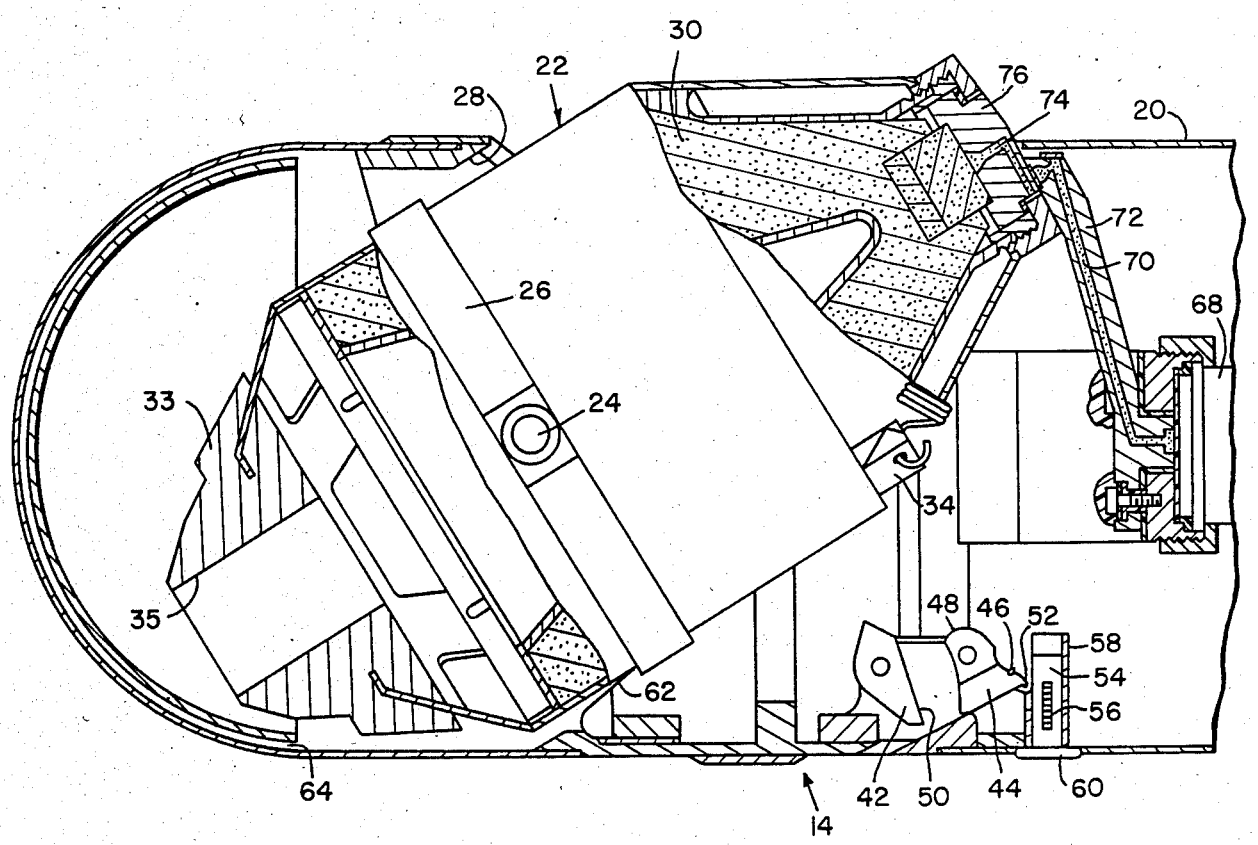
FIG. 3 is a sectional view partially cut-away and illustrating the warhead section in its rotated or canted position and locked in the position it assumes just after exiting the launch tube.

Warhead 22 has a latch member 38 thereon that provides a latch surface 40 (see FIG. 2). A follower member 42 is pivotally mounted to structure of the missile fuselage adapter and has a surface which engages latch surface 40 when in the position illustrated in FIG. 2. A cam member 44 is also pivotally mounted relative to the missile fuselage adapter structure as illustrated in FIG. 2 and has a torsion spring 46 that is mounted about the shaft which pivotally mounts cam member 44 and has one end which engages over a surface of cam member 44 to bias the cam member into an unlatching position. Cam member 44 has a surface 48 which acts with end 50 of follower 42 to hold follower 42 in the latching position when cam 44 is in the latching position illustrated in FIG. 2. Plunger 54 is slidably mounted in housing 58 which is connected as a part of the missile fuselage adapter structure 28 and a spring 56 mounted in an opening through plunger 54 and relative to housing structure 58 biases plunger 54 inwardly of missile housing 20 as illustrated in FIG. 2. Plunger 54 is maintained in the inward position when mounted in a launch tube (not illustrated) by the outer end 60 of plunger 54 being retained by the inner surface of the launch tube. Torsion spring 46 is stronger than spring 56 and therefore biases plunger 54 outward for releasing the releasable latch mechanism including latch surface 40 from latching action from members 42 and 44. A leaf spring 62 is mounted relative to the missile fuselage adapter and is designed to snap behind the surface at one side of ring 26 when in the canted position illustrated in FIG. 3 to latch warhead 22 in the canted position.

Housing 20 has a conventional crush switch 64 at the front end thereof with the crush switch being connected (not illustrated) to a standard warhead safe and arm device 68 to cause the safe and arm device 68 to be initiated and set off to cause explosive detonation to travel from safe and arm device 68 to explosive 70 in arm 72 and from arm 72 to explosive 74 in precision initiation coupler 76 that causes shaped charge 30 to be detonated when in the canted position.

In operation, with the missile and warhead mounted in a launch tube (not illustrated), and with warhead 22 and the release mechanism in the positions illustrated in FIG. 2, when missile 14 is launched from the launch tube, torsion spring 46 causes latch member 44 to bias plunger 54 outward against spring 56 and release follower 50 of member 42 and release pivoted member 42 from latch surface 40 which allows springs 32 to actuate or pivot warhead 22 about trunnions 24 to position warhead 22 in the canted position which is about 30° relative to the longitudinal axis of missile housing 20. In this position, leaf spring 62 engages the surface of ring 26 to latch warhead 22 in the canted position. When cam 44 has end 52 moved past plunger 54, by the action of spring 46, spring 56 moves plunger 54 back into structure 58 to the position illustrated in FIG. 3. The warhead remains in the canted position and when the missile reaches its target, crush switch 64 collapses and completes a circuit to warhead safe and arm device 68 which sets off its explosive as well as explosives 70 and 74 to cause shaped charge 30 to be set off and produce a shaped charge jet through passage 35 of ballist weight 33, and from passage 35 into the target.

We claim:

1. A missile having a shaped charge warhead pivotally mounted in a front portion thereof, said shaped charge warhead having releasable latch mechanism holding said shaped charge warhead in a position in which the longitudinal axis through the warhead is substantially parallel to the longitudinal axis of the missile, biasing means biasing the pivoted warhead to a position which is canted relative to the longitudinal axis of the missile, said releasable latch mechanism being such as to be released upon launching of the missile from a launch tube to allow said warhead to be canted to the canted position, and latch means for latching the warhead in said canted position.

2. A missile as set forth in claim 1, wherein said warhead has a ballist weight at the front thereof to provide a balanced warhead structure which allows the center of gravity of the warhead to remain at the pivot axis.

3. A missile as set forth in claim 2, wherein said missile includes a crush switch at the front thereof that is utilized to set off a safe and arm device in the missile to cause detonation means to be set off and set the shaped charge of the warhead off.

4. A missile as set forth in claim 1, wherein said release mechanism includes a follower member for engaging a latch surface on said warhead, a cam member that holds said follower member in a latching position and has a spring which biases the cam member toward an unlatching position, and a plunger which is slidably mounted and maintains said cam member in a latching position until the missile is launched from a launch tube.

* * * * *